United States Patent [19]

Ikeda et al.

[11] Patent Number: 4,851,903

[45] Date of Patent: Jul. 25, 1989

[54] AUTOMATIC FOCUSING SYSTEM OF AN OBSERVING MEANS FOR INSPECTING AN OBJECT

[75] Inventors: Hiroshi Ikeda, Kawasaki; Shuji Takeshita, Yokohama, both of Japan

[73] Assignee: Fujitsu Limited, Kawasaki, Japan

[21] Appl. No.: 105,734

[22] Filed: Oct. 7, 1987

[30] Foreign Application Priority Data

Oct. 7, 1986 [JP] Japan ................................ 61-238801

[51] Int. Cl.$^4$ .............................................. H04N 7/18
[52] U.S. Cl. .................................... 358/101; 358/227; 358/107
[58] Field of Search ............... 358/227, 101, 107, 106, 358/93; 382/8, 54

[56] References Cited

U.S. PATENT DOCUMENTS 4,186,301  1/1980  Basire ................................ 358/93 X
4,661,986  4/1987  Adelson ........................... 358/227 X
4,731,864  3/1988  Modla .............................. 358/93 X Primary Examiner—James J. Groody
Assistant Examiner—Victor R. Kostak
Attorney, Agent, or Firm—Staas & Halsey

[57] ABSTRACT

A TV camera for visually inspecting an object is focused to a designated inspecting point, while being shifted to that inspecting point by utilizing a calculated distance from the TV camera to the next inspecting point without actually measuring the distance. The distance to the next inspecting point is calculated from a plane equation several of triangular planes formed over the object by a plurality of reference points previously designated on the object. The plane equations are calculated before executing inspection, by using distances, actually measured by distance measuring means, from the TV camera to the reference points.

11 Claims, 7 Drawing Sheets

FIG. 7

| | CONDITION | PLANE EQUATION |
|---|---|---|
| T1 | $y \geq \ell 23$ <br> $y < -\dfrac{\ell 12 + \ell 23}{\ell 34 + \ell 49} x + \ell 12 + \ell 23$ | $z = \dfrac{z5 - z2}{\ell 25} x + \dfrac{z1 - z2}{\ell 12} (y - \ell 23) + z2$ |
| T2 | $y < \ell 23$ <br> $y \geq \dfrac{\ell 12 + \ell 23}{\ell 34 + \ell 49} x$ | $z = \dfrac{z3 - z2}{\ell 23} (\ell 23 - y) + \dfrac{z5 - z2}{\ell 25} x + z2$ |
| T3 | $x \leq \ell 34$ <br> $y < \dfrac{\ell 12 + \ell 23}{\ell 34 + \ell 49} x$ | $z = \dfrac{z5 - z4}{\ell 45} y + \dfrac{z3 - z4}{\ell 34} (\ell 34 - x) + z4$ |
| T4 | $x < \ell 16$ <br> $y \geq -\dfrac{\ell 12 + \ell 23}{\ell 34 + \ell 49} x + \ell 12 + \ell 23$ | $z = \dfrac{z1 - z6}{\ell 16} (\ell 16 - x) + \dfrac{z5 - z6}{\ell 56} (\ell 12 + \ell 23 - y) + z6$ |
| T5 | $x \geq \ell 16$ <br> $y > \dfrac{\ell 12 + \ell 23}{\ell 34 + \ell 49} x$ | $z = \dfrac{z5 - z6}{\ell 56} (\ell 45 + \ell 56 - y) + \dfrac{z7 - z6}{\ell 67} (x - \ell 16) + z6$ |
| T6 | $y > \ell 89$ <br> $y \leq \dfrac{\ell 12 + \ell 23}{\ell 34 + \ell 49} x$ | $z = \dfrac{z7 - z8}{\ell 78} (y - \ell 89) + \dfrac{z5 - z8}{\ell 58} (\ell 25 + \ell 58 - x) + z8$ |
| T7 | $y \leq \ell 89$ <br> $y > -\dfrac{\ell 12 + \ell 23}{\ell 34 + \ell 49} x + \ell 12 + \ell 23$ | $z = \dfrac{z5 - z8}{\ell 58} (\ell 25 + \ell 58 - x) + \dfrac{z9 - z8}{\ell 89} (\ell 89 - y) + z8$ |
| T8 | $x > \ell 34$ <br> $y \leq -\dfrac{\ell 12 + \ell 23}{\ell 34 + \ell 49} x + \ell 12 + \ell 23$ | $z = \dfrac{z9 - z4}{\ell 49} (x - \ell 34) + \dfrac{z5 - z4}{\ell 45} y + z4$ |

AUTOMATIC FOCUSING SYSTEM OF AN OBSERVING MEANS FOR INSPECTING AN OBJECT

BACKGROUND OF THE INVENTION

The present invention relates to an automatic focusing system operating with a TV (television) camera for inspecting a surface of an object to be viewed, and, more particularly, to an automatic focusing system operating with a TV camera for insepcting printed patterns on a printed wiring board, making compensation for differences in distances between the TV camera and a part of the printed patterns on the surface of the printed wiring board.

Recently, patterns printed on a printed wiring board are very fine, so that when the printed patterns are inspected using a TV camera, the whole printed wiring board cannot be inspected at the same time. Therefore, a plurality of inspecting points are previously designated on the printed wiring board so that a part, to be inspected, pattern exists around each inspecting point. The printed patterns on the printed wiring board are inspected by sequentially aligning a line of sight of the TV camera with the inspecting point, by point. Furthermore, recently, a printed wiring board, which will be called simply "board" hereinafter, has scaled up and a thickness of the board increases to include multiple layers. Accordingly, phenomena such as warp and locally varied thickness occur in the board. Such phenomena produce a difference among distances from the TV camera to respective inspecting points. (The distance mentioned above will be called "inspecting camera distance" hereinafter.) For example, when inspecting the board having a size of of 300 mm×300 mm and large layers such as 14 layers, the inspecting camera distance varies as much as1.5 mm at maximum. When, thus, the size of the board is large, many inspecting points are required to be designated on the board, and focusing of the TV camera for each inspecting point must be performed "automatically" at a high speed.

Recently, in the automatic focusing system, an active means such as an infrared ray or ultrasonic wave is used for measuring the inspecting camera distance. That is, in the prior art, the TV camera is automatically focused by measuring the inspecting camera distance by using the infrared ray or an ultrasonic transmitting and receiving apparatus with the TV camera. Furthermore, in the prior art, inspecting a printed pattern around an inspecting point and shifting the board so as to align the line of sight of the TV camera with a next inspecting point are also performed automatically. Such automatic inspection of the printed patterns on the board has been heretofore performed in the prior art in accordance with the following steps: (1) aligning the the TV camera with an inspecting point by shifting the board, for example, in X and Y directions; (2) measuring the inspecting camera distance by the infrared or ultrasonic transmitting and receiving apparatus; (3) adjusting a focusing mechanism of the TV camera, using the measured distance (4) inspecting a printed pattern around the inspecting point; (5) aligning the the TV camera with a next inspecting point by shifting the board; and (6) repeating the above steps from (2) to (5) until the printed patterns around the entire number of inspecting points are inspected, in other words, until the pattern inspection of the board is over.

When the printed patterns on the board are very fine, many inspecting points are necessary for inspecting the printed patterns, and a very long period of time is required for completing the inspection of the printed patterns, resulting in an increased fabrication cost of the board. Generally, the number of inspecting points depends on a size of the board, a density of printed patterns on the board and a characteristic of the TV camera, such as a field of view (FOV) and a resolution thereof. For example, when the board has a size of 300 mm×300 mm, the printed patterns have a density such that wiring patterns, each having a width of 0.2 mm, are arranged with 0.5 mm pitch. Typically when a SONY XC-38 type TV camera is used at least 2,000 inspecting points are required on one side surface of the board (4,000 inspecting points are required on both side surfaces of the board). Wherein, the SONY XC-38 type TV camera has an FOV such that an area of 2.56 mm×2.56 mm in size can be viewed on the surface of the board and a resolution that can be resolved into 491×384 picture elements. In the above case, to perform the steps (1) or (5), and (2) and (3), a time of approximately 3 sec is required (approximately 1 sec for each); incidently, approximately 3 sec are required for the real inspection in the step (4), so that a time of 6 sec is required for inspecting the printed pattern around one inspecting point. Therefore, a time of 6,000 sec (3 sec/inspecting point ×2,000 inspecting point=6,000 sec=1 hour and 40 minutes), is required to the steps (1) or (5), and (2) and (3), and a time of 12,000 sec (6 sec/inspecting point ×2,000 inspecting point=12,000 sec=3 hours and 20 minutes) is required for inspecting the printed patterns on one side of the board. Taking such a long time for inspecting the printed patterns on one side surface of the board reduces; the productivity and increases production costs of the boards. Therefore, how to reduce this long time has been a big problem in the prior art. If the time required to perform the step (2) (for measuring the distance) is saved to zero, 33 minutes can be reduced. The present invention intends to reduce the time for the step (2) to zero.

SUMMARY OF THE INVENTION

An object of the present invention is to increase a speed of an automatic inspection, performed by using a TV camera, of printed patterns on a printed wiring board.

Another object of the present invention is to increase a speed of an automatic inspection, performed by using a TV camera, of printed patterns on a large sized printed wiring board having a warp and a locally different thickness.

Still another object of the present invention is to increase productivity of printed wiring board and to reduce the production costs of the printed wiring boards.

The above objects of the present invention are achieved by: (1) previously designating a plurality of reference points on the surface of a printed wiring board (board) on which patterns to be inspected are printed, considering a warp and a locally different thickness of the board; for example, 9 reference points, consisting of a center point, 4 corner's points and 4 middle points of 4 sides of a four-sided board, are designated as the reference points; (2) measuring distances from the TV camera to the reference points; (3) providing a plurality of triangular planes (8 triangular planes in case of 9 reference points of the above example) each formed by connecting three, which are most adjacent to each other, of the reference points and calculating a plurality of plane equations (8 plane equations in case of 9 reference points); wherein the plane equations are calculated under setting the board in X, Y and Z coordinates so that the board is set on a plane of X and Y coordinates, using a direction of a line of sight of the TV camera as a Z axis; (4) designating an inspecting point around which a printed pattern, to be inspected exists; (5) calculating a Z coordinate of the inspecting point by substituting X and Y coordinates of the inspecting point into a plane equation of a triangular plane to which the X and Y coordinates of the inspecting point belong, and calculating a distance (inspecting camera distance) between the TV camera and the inspecting point; (6) performing a focus adjustment of the TV camera by using the Z coordinate calculated in the above step (5); (7) positioning the board so that the inspecting point is on a line of sight of the TV camera; (8) inspecting the printed pattern around the inspecting point with the TV observation of the printed pattern; and (9) positioning the board so that a next inspecting point is on the line of sight of the TV camera.

In the above steps, the steps (1), (2) and (3) are performed previously before starting the inspection of the printed patterns on the board, and the steps (4), (5) and (6) are performed during executing the step (7). Doing thus, the time wasted, in the prior art for measuring the distance between the TV camera and inspecting point can be reduced to zero, which reduces the time for the preliminary steps in the prior art from 3 sec to 2 sec.

In the present invention, the measurement of the distance between the TV camera and the reference point stated in the above step (2) is passively performed by using a slit mark, not performed by an active means such as the infrared or the supersonic means used in the prior art. Applying such passive means, equipment costs for an automatic focusing system can be reduced.

In the present invention, even though, as stated above, the distance (inspecting camera distance) between the TV camera and the inspecting point is estimated from the calculation of the plane equation, accuracy of the inspecting camera distance obtained in the present invention is sufficiently high, compared with the accuracy obtained in the prior art.

BRIEF DESCRIPTION OF THE DRAWINGS

FIG. 5($b$) is a distribution chart of the slit mark;

FIG. 7 is a figure showing a plurality of plane equations;

DESCRIPTION OF THE PREFERRED EMBODIMENT

Figure 1:
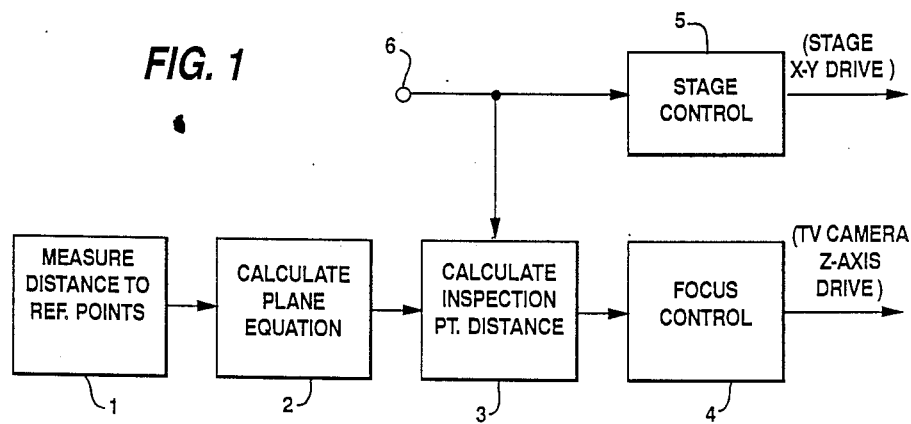
FIG. 1 is a principle block diagram of an automatic focussing system concerning the present invention.

A principle block diagram of an automatic focussing system concerning to the present invention is shown in FIG. 1. In FIG. 1, each block shows the following.

A block of reference numeral 1 shows a means of measuring distances from a TV camera and reference points previously designated on a surface of a printed wiring board. For example, 9 points consisting of four corners points, four middle points of four sides and a center point of a four-sided printed wiring board can be designated as the reference points.

A block of reference numeral 2 shows a means of calculating plane equations corresponding to triangular planes formed by connecting three, which are most adjacent to each other, of the reference points. For example, the number of the triangular planes are eight, when the number of the reference points are nine.

A block of reference numeral 3 shows a means of calculating a distance (camera inspecting distance) between the TV camera and an inspecting point around which a printed pattern exists. A signal of X and Y coordinates data for inspecting point is fed from an input terminal 6 to the block 3. A triangular plane including the X and Y coordinates of the inspecting point is selected and the X and Y coordinates are substituted in a plane equation so that the Z coordinate of the inspecting point is obtained. From the Z coordinate, the camera inspecting distance can be obtained.

A block of reference numeral 4 shows a means for focussing the TV camera in accordance with the obtained inspecting camera distance.

A block of reference numeral 5 shows a means for controlling a stage, on which the printed wiring board is mounted, so that the stage is shifted in X and Y directions for aligning the line of sight of the TV camera with a next inspecting point on the board.

In the above explanation, the blocks 1 and 2 can function as "preliminary steps" for the inspection and the blocks 3, 4, 5 together with an inspecting means (not shown in FIG. 1), can function as "executing steps" of the inspection.

When the inspection of the printed pattern around an inspecting point is completed, a signal for a next inspecting point is input and the stage is shifted as stated above. However, at the same time, the means for focusing the TV camera for the next inspecting point is executed by the the means of blocks 3 and 4.

Accordingly, a time required to spend for focusing the TV camera is included in a time for shifting the stage, so that a total time required to inspect the printed pattern around an inspecting point is reduced.

A further detail of the present invention will be explained by disclosing an automatic focusing system embodying the present invention, referring to FIGS. 2-11.

Figure 2:
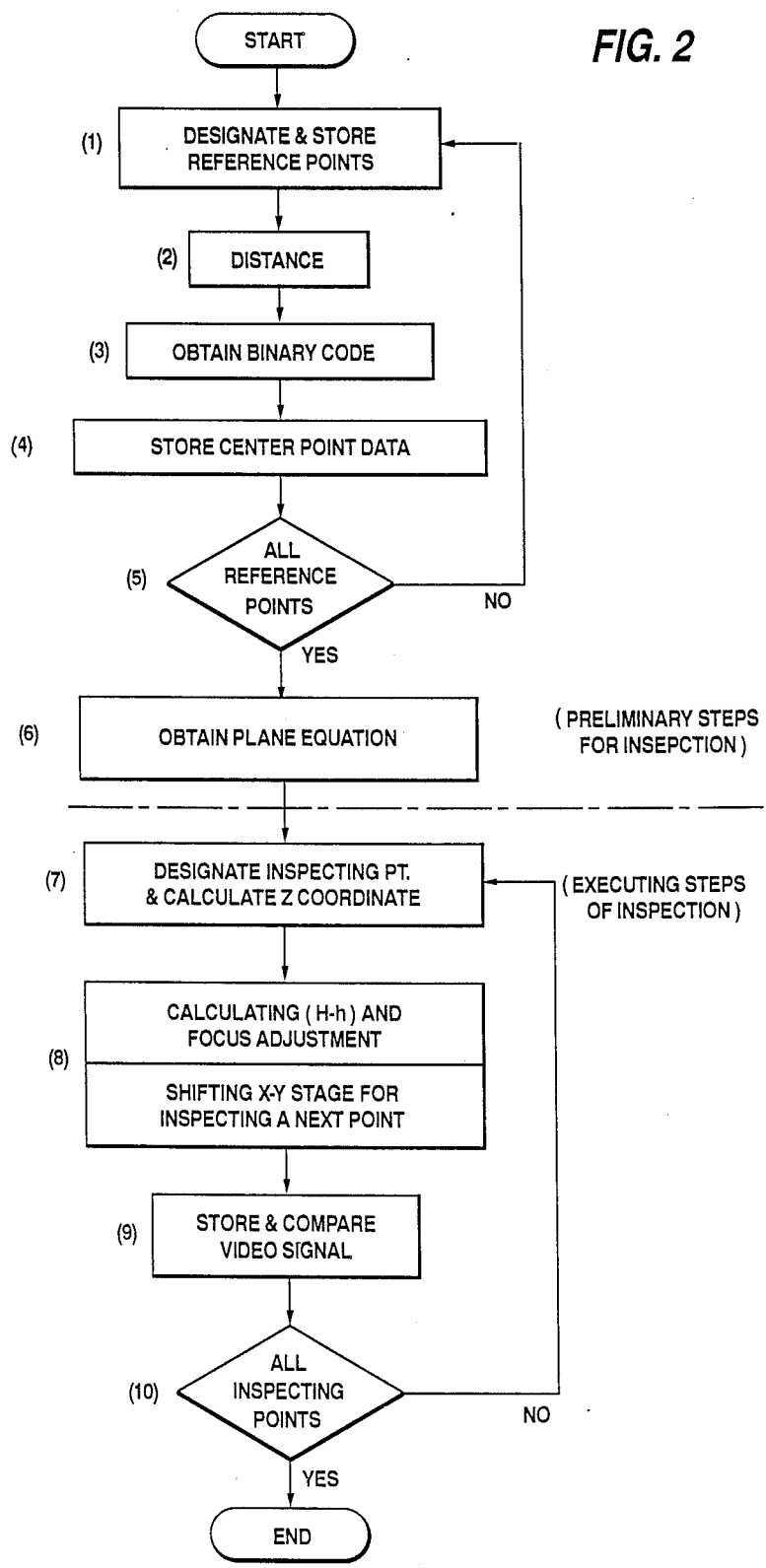
FIG. 2 is a flowchart indicating operation steps of the automatic focussing system embodying the present invention.

The function of the present invention will be explained in the order of the following steps which are shown in the flowchart of FIG. 2.

Figure 3:
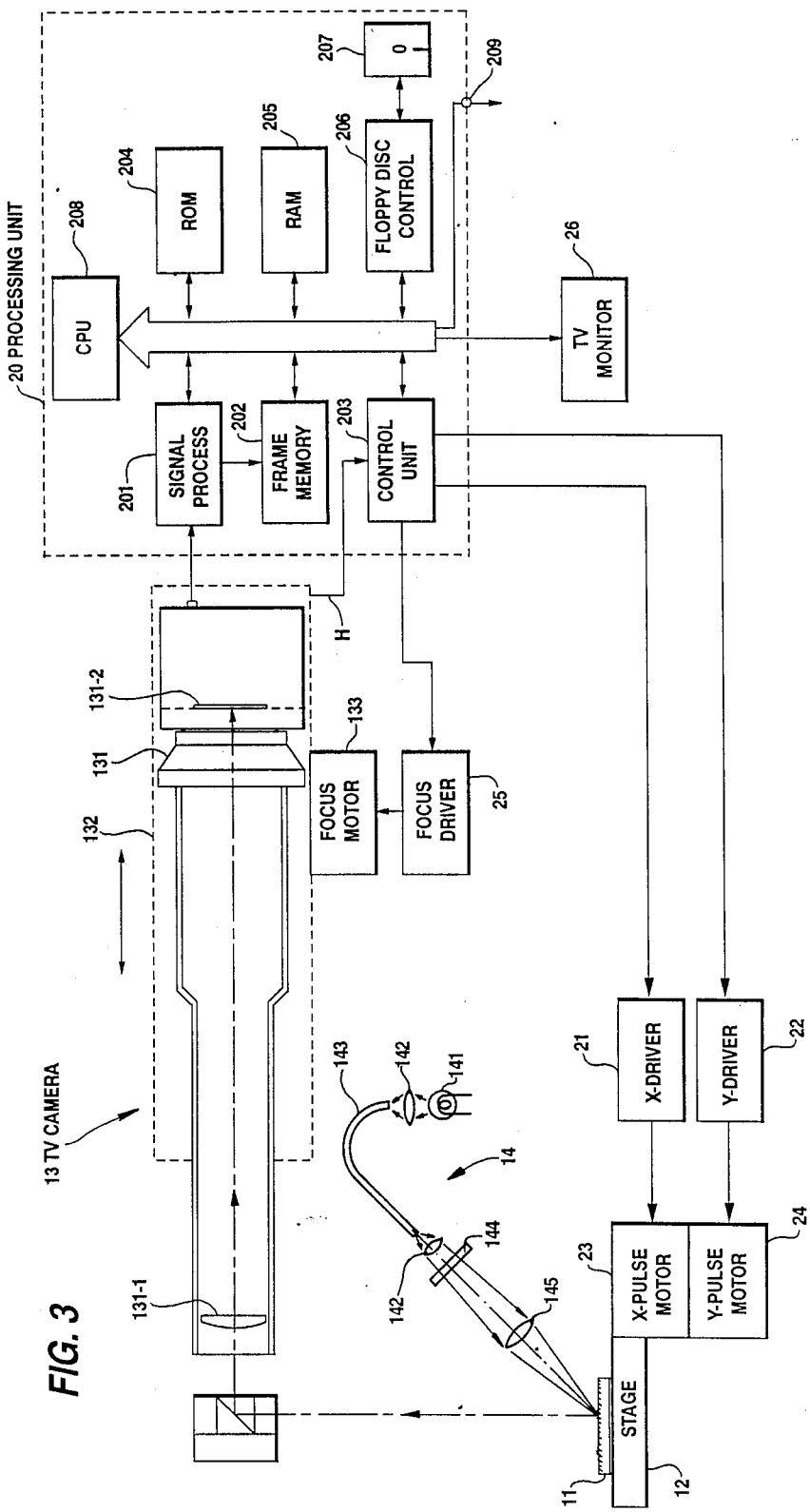
FIG. 3 is a block diagram of an automatic focusing system embodying the present invention.
Figure 4:
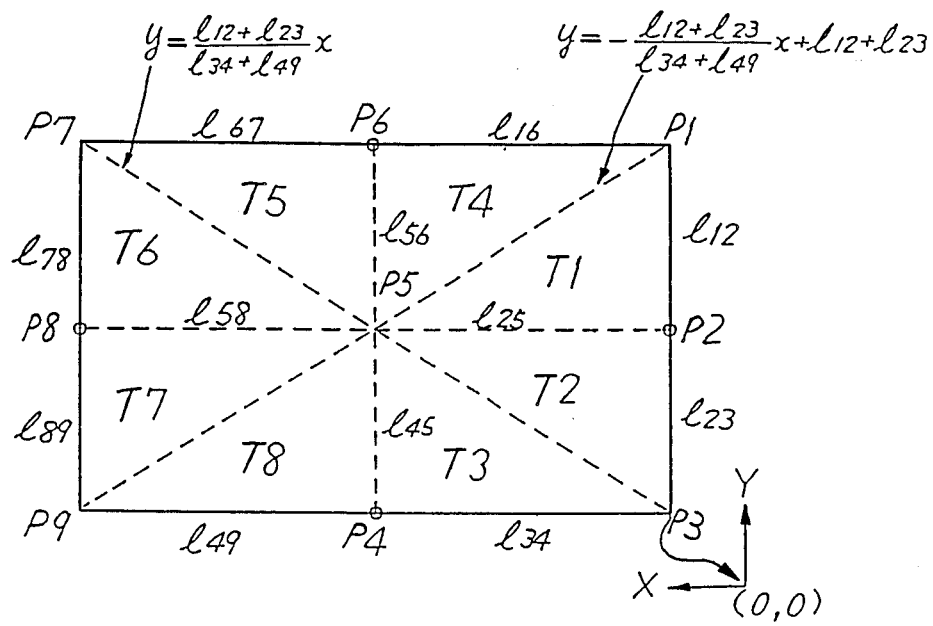
FIG. 4 is a schematic plane view of a printed wiring board for illustrating a plurality of reference points and triangular planes.

STEP (1) Points P1-P9 shown in FIG. 4, consisting of four corner points, four middle points and one center point of the four-sided printed wiring board (board) 11 are designated as reference points. Signals of X and Y coordinates for the 9 reference points are stored in a RAM (Random Access Memory) 205 of a processing unit 20 shown in FIG. 3. An X and Y coordinate signal for one of the 9 reference points is read out and input to a mechanism control unit 203 in the processing unit. Then the mechanism control unit 203 controls an X driver 21 and a Y driver 22, so as to position the board 11 so that the inspecting point is on the line of sight of a TV camera 13. The board 11 is mounted on a stage 12, and the positioning of the board 11 is performed by an X pulse motor 23 and a Y pulse motor 24, controlled by an output signal from the mechanism control unit 203.

STEP (2) a distance between the TV camera 13 and the reference point is measured passively by using an optical slit mark projected a slant onto the board 11 from a mark projector 14 as shown in FIG. 3. The TV camera 13 comprises a lens 131-1, a CCD (Charge Coupled Device) 131-2, a focus adjusting mechanism 132 and a focus adjusting motor 133. An image of the slit mark projected on the board 11 is formed on the CCD 131-2 passing through the lens 131-1, and an analog electric signal outputs from the CCD 131-2 corresponding to the brightness of the image formed on the CCD 131-2. The output signal from the TV camera 13 (CCD 131-2) is fed to a signal processing board 201 in the processing unit 20 and converted to a digital signal, then the digital signal is stored in a frame memory 202.

STEP (3) The digital signal stored in the frame memory 202 is processed to obtain a binary-coded signal by a CPU (Central Processing Unit) 208 in the processing unit 20, using a program stored in a ROM (Read Only Memory) 204.

Figure 5A:
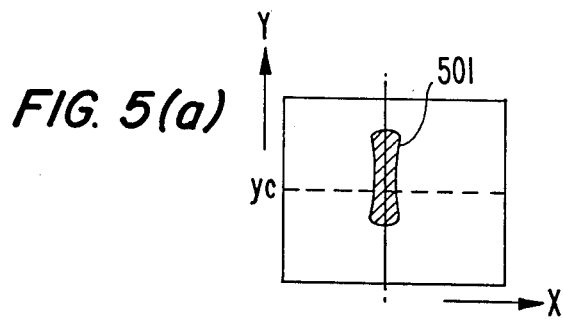
FIG. 5($a$) is a pattern illustration of a slit mark depicted on X and Y coordinates.
Figure 5B:
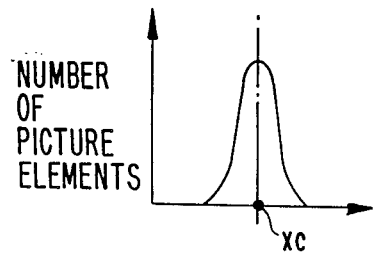

STEP (4) The binary-coded signal corresponding to the slit mark is processed by the CPU 208, using a program stored in the ROM 204, so that a center point of the slit mark distribution is along an X axis which passes through a center of Y coordinates of the slit mark. FIG. 5(a) shows a slit mark 501 depicted on X-Y coordinates, and FIG. 5(b) is a distribution chart depicted on coordinates consisting of the X coordinates on a horizontal axis and the number of picture elements, which is equal to the number of data "1" in a small unit area, on a vertical axis. In FIG. 5(b), the center point of the distribution is shown by a mark $X_c$. The position data of the X and Y coordinates for the center points ($X_c$) of the 9 reference points are stored in the frame memory 202.

Figure 6:
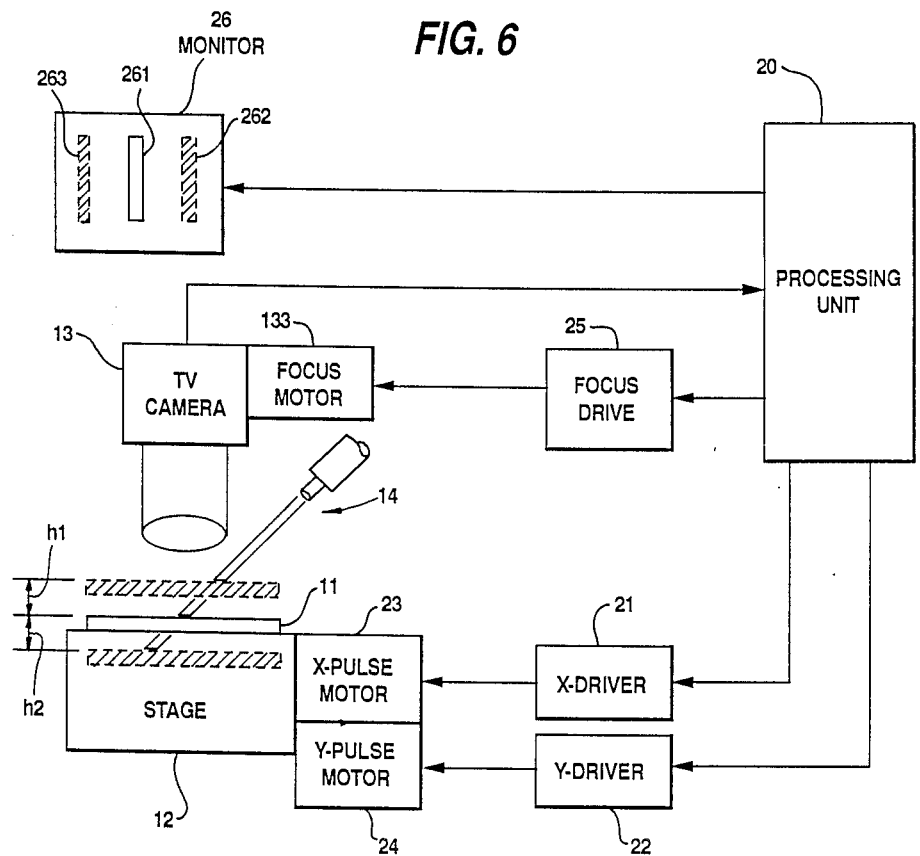
FIG. 6 is a schematic block diagram of the automatic focussing system embodying the present invention, for illustrating how to obtain a distance between the TV camera and an inspecting point by using a slit mark.

STEP (5) As shown in FIG. 3, a mark projector 14 comprises an optical source 141, relay lenses 142, an optical fiber 143, a slit 144 and a projection lens 145, so that a slit mark is projeced aslant on a surface of the board 11. Therefore, when distances from the TV camera to the reference points are different, having different amounts $h_1$ and $h_2$ as shown in FIG. 6, an image, is formed on the CCD 131-2 at a different position as shown in a monitor 26 of FIG. 6. When the surface of the board 11 is higher than a normal position by the amount of $h_1$, an image 262 of the slit mark is shifted in a right-hand direction from a normal image position 261, and when it is lower than the normal position by the amount of $h_2$, an image 263 of the slit mark is shifted in a left-hand direction from the normal image position 261, as shown in an illustrating figure of a TV monitor 26 in FIG. 6. FIG. 6 is a schematic block diagram of the automatic focussing system embodying the present invention, for illustrating the image shifting. In FIG. 6, the same reference numerals as in FIG. 3 designate the same blocks or parts as in FIG. 3. From the amount of shift of the slit mark image, the difference between the TV camera and the reference point from the normal distance can be obtained. That is, an actual center point of an actual image of the slit mark is obtained as stated in the STEP (5), and the data (X coordinates) of the actual center point is compared with data, stored in the RAM 205, of the normal center point, so that the distance between the TV camera and the reference point can be obtained. Thus, the distances from the TV camera to the 9 reference points can be obtained. The above processes are performed by the CPU 208, using a program stored in the ROM 204.

STEP (6) Eight plane equations for eight triangular planes, formed on the board 11 by connecting 9 reference points as shown in FIG. 4, are obtained by the CPU 208, using a program stored in the ROM 204, and the 8 plane equations are stored in the RAM 205. The 8 plane equations are made by positioning the board 11 in X, Y and Z coordinates; The X and Y coordintes are formed by setting a plane of the stage 12 as the X and Y coordinates, and the Z coordinates are obtained from the distances, obtained in the above STEP (5), from the TV camera to the reference points. The obtained 8 plane equations are stored in the RAM 205.

STEP (7) An inspecting point is designated in accordance with a program stored in the ROM 204, then a Z coordinate of the inspecting point is calculated by substituting the corresponding X and Y coordinates into an appropriate plane equation. The obtained Z coordinate of the inspecting point will be treated as an "h" signal. Wherein, the X and Y coordinates of the inspecting point are previously stored in the RAM 205. The calculation of the Z coordinate is processed by the CPU 208, using a program stored in the ROM 204.

STEP (8) In the focus adjustment mechanism 132, there is a signal generator (which is not shown in FIG. 3) for producing a focus position signal "H" of the TV camera 13. The signal H is fed into the mechanism control unit 203 and a difference (H−h) is calculated by the CPU 208 in accordance with a program stored in the ROM 204. The mechanism control unit 203 controls the focus adjusting driver 25 so that the focus adjusting motor 133 drives the focus adjusting mechanism 132 until the difference (H−h) becomes zero. When the difference (H−h) becomes zero, the focusing of the TV camea 13 is completed. During execution of the above STEP (7) and this STEP (8), the stage 12 is shifted under the control of the mechanism control unit 203 so that the inspecting point on the board 11 is on the line of sight of the TV camera 13. This control is also processed by the CPU 208 in accordance with a program stored in the ROM 204.

STEP (9) Then, the TV camera 13 observes the printed pattern around the inspecting point, so that an image of the printed pattern is formed on the CCD 131-2 in the TV camera 13. The CCD 131-2 converts the image to an analog video signal of the printed pattern. The analog video signal is fed to the signal processing board 201 in the processing unit 20 and converted to a digital video signal. The digital video signal of the printed pattern is stored in the frame memory 202 by the CPU 208 in accordance with a program stored in the ROM 204. The digital video signal stored in the frame memory 202 is compared with a normal digital video signal stored in the RAM 205, in accordance with the CPU 208, using a program stored in the ROM 204. Usually, the digital video signals of the printed patterns on the board are stored in an FD (Floppy Disk) 207, and when a inspecting point is designated, a printed pattern is selected from the FD 207 by an FD controller 206 in accordance with a process performed by the CPU 208, using a program stored in the ROM 204. After the comparison between the digital video signal stored in the frame memory 202 and the normal digital video singal stored in the RAM 205, a resultant signal of the inspection is output from an output terminal 209.

STEP (10) When the inspection of the printed pattern designated in the STEP (7) is determined to be correct, the board 11 is shifted so that a next inspecting point is on the line of sight of the TV camera, and at the same time the STEPs (7), (8) and (9) are performed about the next inspecting point. This process is automatically continued until inspections of the printed patterns around the entire number of inspecting points are completed unless a sub-standard inspection result occurs during the inspection.

In the above STEPs, shifting the board 11 so that the inspecting point is on the line of sight of the TV camera during the calculation of (H-h) during the focus adjustment, is a point of the present invention. Doing enables the time required for the inspection of the printed patterns on the board can be greatly reduced.

The derivation of the plane equation in step 6 of the preferred embodiment of this invention is described as follows.

First, the equation of the triangle T1 shown in FIG. 4 will be considered. The coordinates of the apexes of the triangle T1, P1, P2 and P5 are $(0, l_{12}, z_1)$, $(0, 0, z_2)$ and $(l_{25}, 0, z_5)$, respectively. If the equation of T1 is written as $ax + by + cz + d = 0$, a ratio of the constant a, b, c and d is determined from the following three equations, $$b \cdot l_{12} + cz_1 + d = 0 \quad (1)$$

$$cz_2 + d = 0 \quad (2)$$

$$a \cdot l_{25} + cz_5 + d = 0 \quad (3)$$

as:

$$a:b:c:d = \frac{z_5 - z_2}{l_{25}} : \frac{z_1 - z_2}{l_{12}} : (-1) : z_2 .$$

The equation of T1 is rewritten as follows:

$$\frac{z_5 - z_2}{l_{25}} \cdot x + \frac{z_1 - z_2}{l_{12}} \cdot y - z + z_2 = 0$$

The height z including the variation of it is represented as:

$$z = \frac{z_5 - z_2}{l_{25}} \cdot x + \frac{z_1 - z_2}{l_{12}} \cdot y + z_2$$

Since the origin of the plane T1 is shifted as much as $l_{23}$ along Y-axis from the origin of the board, z should be written as $$z = \frac{z_5 - z_2}{l_{25}} \cdot x + \frac{z_1 - z_2}{l_{12}} (y - l_{23}) + z_2$$

The eight equations of the eight triangles are summarized in FIG. 7. In the figure, the condition column expresses the region of X and Y coordinates of the points in the triangle.

In FIG. 4, two diagonals of the rectangle, consisting of four points P1, P3, P9, P7, are expressed in the coordinate system having the origin at P3 and having an X-axis made by connecting the points P3 and P9 and a Y-axis made by connecting the points P3 and P1. While, the origins of the plane equations of T1 and T2, T3 and T8, T4 and T5, and T6 and T7 in FIG. 7 are at P2, P4, P6 and P8 respectively. Although the correction of the inspecting camera distance is based on the plane approximation, the error is within tolerance provided that the number of division is properly selected.

Figure 8A:
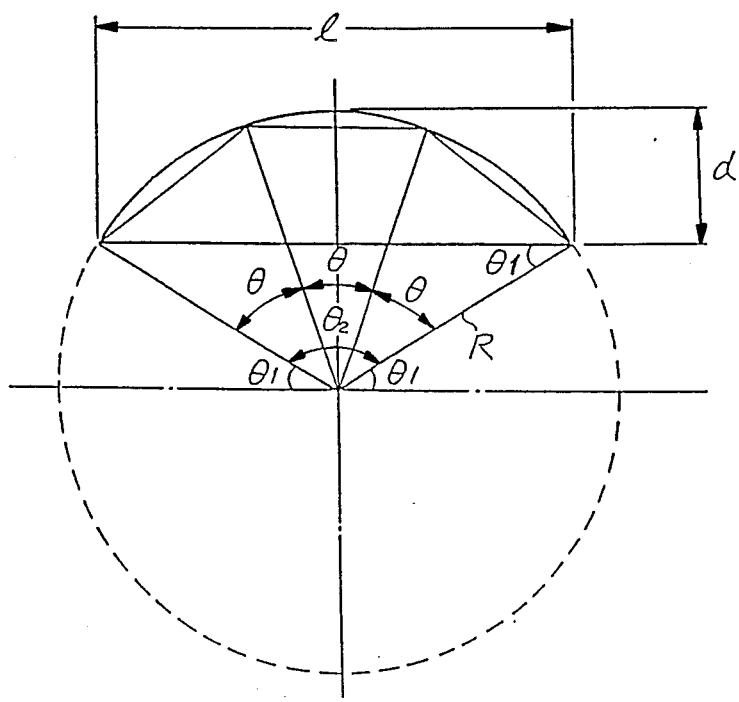
FIGS. 8($a$) and 8($b$) are illustrating diagrams for showing accuracy of a distance measurement between the a TV camera and inspecting point, obtained by the automatic focussing system embodying the present invention.
Figure 8B:
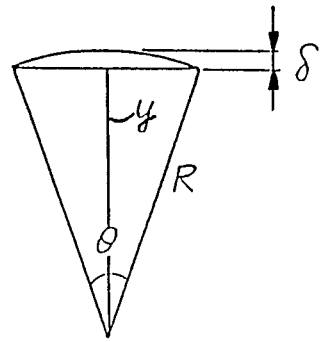

For the case of a simply curved surface as shown in FIGS. 8(a) and 8(b), the relationship between the error and the number of division will be discussed. The relation between a side length of printed wiring board "l", a distance variation of the board "d", and a radius R of a curvature of the board is $$R = (l^2 + 4d^2)/8d \quad (11)$$

Let $\theta$ HD 2 be an angle viewing the whole boad $\theta$ is an angle viewing the divided portion of the board at the center of the curvature, and $\delta$ is a tolerance, then, from $\delta = R - y$ and $y = R \cos(\theta/2)$, $$\theta = 2 \cos^{-1} ((R - \delta)/R) \quad (12)$$

is obtained.

In FIG. 8(a), it is obvious that $$\sin \theta_1 = (R - d)/R,$$

then, from the above equation, $\theta_1$ is obtained as $$\theta_1 = \sin^{-1} ((R - d)/R).$$

Hence, $$\theta_2 = 180° - 2 \sin^{-1} ((R - d)/R) \quad (13)$$

can be obtained.

Since the number of division "n" is $\theta_2/\theta_1$, n can be written as:

$$n = \frac{180° - 2 \sin^{-1}((R - d)/R)}{2 \cos^{-1}((R - \delta)/R)} \quad (14)$$

In FIG. 8(a), "l" is a side length, "d" indicates an amount of a warp of the board, and "$\delta$" is the tolerance of the inspecting camera distance.

When $l = 280$ mm, $d = 0.86$ mm and $\delta = 0.25$ mm, the following results can be obtained: $R = 11395.78$ mm from equation (11), $\theta = 0.759$ and $\theta_2 = 1.408$ from equations (12) and (13), therefore $n = 1.855$.

When $l = 200$ mm and d and $\delta$ are the same as the above, the following results can be obtained similarly: $R = 5814.38$ mm, $\theta = 1.063$, $\theta_2 = 1.971$ and $n = 1.854$.

Figure 9:
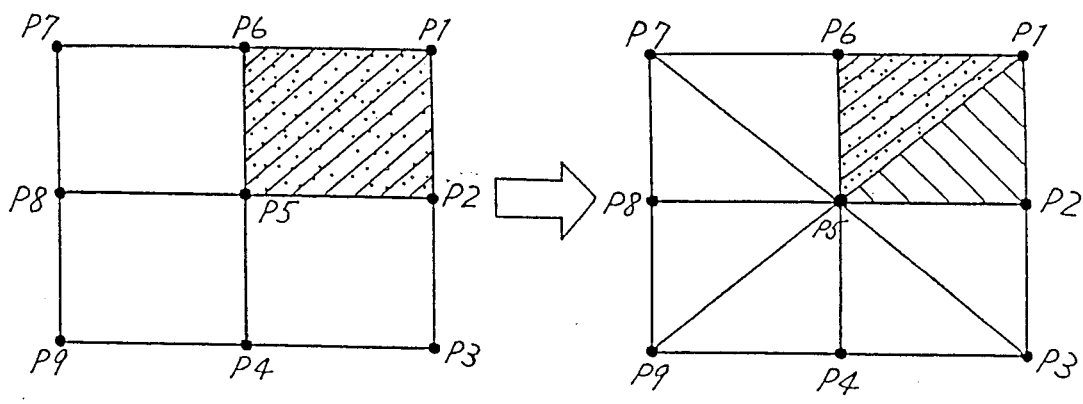
FIG. 9 is a diagram illustrating that four divided rectangles on a surface of a printed wiring board are further divided into eight triangles whose plane equations are determined.

It is found that dividing the board into four rectangles is enough for the case described above. Dividing each rectangle into two triangles as shown in FIG. 9, eight equations of the plane are determined for each triangle.

Figure 10:
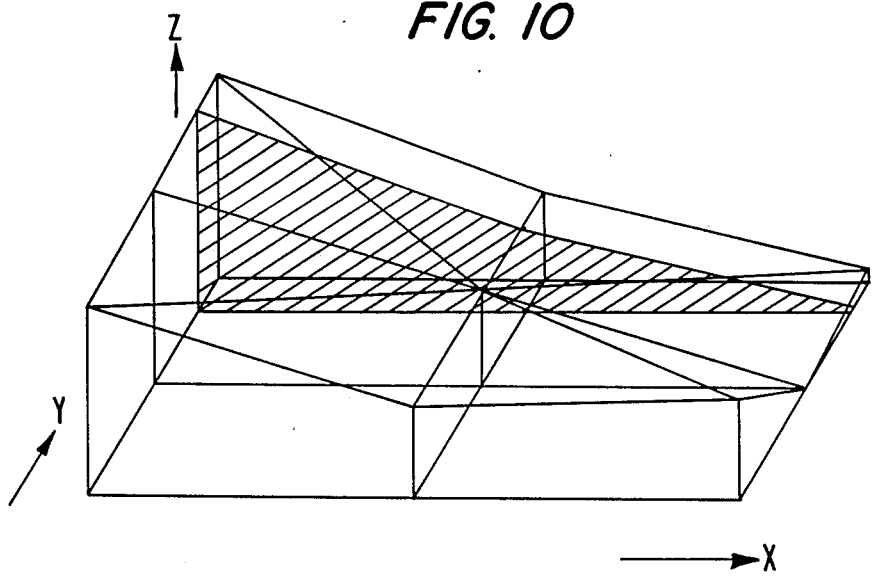
FIG. 10 is a perspective view of a printed wiring board, for illustrating plane separation, performed by the automatic focussing system embodying the present invention
Figure 11:
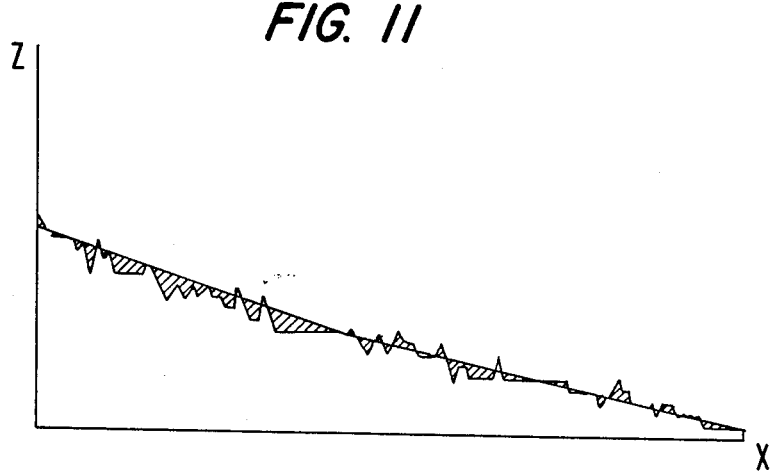
FIG. 11 is an illustrating diagram for showing accuracy of distance measurement, between TV camera and an inspecting point, obtained by the automatic focusing system embodying the present invention.

In FIG. 10, the distance variation of the board is illustrated in perspective view and the measured error in the approximation along the X direction is plotted in FIG. 11. The maximum error is approximately 0.1 mm.

In the above embodiment, the automatic focussing system operates with the TV camera, and the object of the inspection is the printed patterns on the printed wiring board. However, other observing means can be used with the automatic focussing system, and other objects such as an arranged pattern of parts mounted on a board can be inspected.

What is claimed is:

1. An automatic focusing system for inspecting an object by observing the object, said automatic focusing system having X, Y and Z coordinates, corresponding reference data and comprising:

observing means having a line of sight for observing the object;

reference point means for designating a plurality of reference points on the object;

measuring means for measuring distances from the observing means to the reference points;

calculating means for calculating one of a plurality of surface plane equations corresponding to a plurality of triangular planes each formed by groups of three of the reference points adjacent to each other, the formed triangular planes not crossing each other, said calculating means operating while having the object in the X, Y and Z coordinates and calculating Z coordinates of the reference points from the distances measured by said measuring means;

inspecting point means for designating an inspecting point having a surrounding area, from the plurality of reference points, the inspecting point being defined by corresponding X and Y coordinates for aligning the line of sight of said observing means to observe the surrounding area of the object around the designated inspecting point;

selecting means for selecting a triangular plane, corresponding to one of the plane equations, which includes the X and Y coordinates of the designated inspecting point, from the plurality of the triangular planes;

Z-calculation means for calculating a Z coordinate of the designated inspecting point by substituting the corresponding X and Y coordinates of the designated inspecting point into the surface plane equation corresponding to the selected triangular plane;

focusing means for focusing said observing means in accordance with the calculated Z coordinate of the designated inspecting point;

positioning means for moving the object in X and Y directions so that the designated inspecting point is on the line of sight of said observing means, from a previous position of the object, in which a previous inspecting point has been on the line of sight of said observing means;

area inspecting means for inspecting the surrounding area existing around the designated inspecting point of the object, and for comparing the inspected area with the reference data of the object;

executing means for executing said inspecting point means, said selecting means, said Z-calculation means and said focusing means while executing said positioning means;

repeating means for repeating execution of said executing means and said area inspecting means, to inspect the surrounding area existing around a next inspecting point, of the object until all surrounding area existing around all inspecting points previously designated are inspected; and automatic execution means for executing said reference point means, said measuring means, said calculating means, said inspecting point means, said selecting means, said Z-calculation means, said focusing means, said positioning means, said area inspecting means, said executing means and said repeating means automatically.

2. An automatic focusing system according to claim 1, wherein said automatic execution means comprises:

a micro processing unit;

a read only memory connected to said microprocessing unit storing programs for executing operation of said micro processing unit;

a random access memory connected to said microprocessing unit storing data; and a memory connected to said micro processing unit storing the reference data of the object.

3. An automatic focusing system for inspecting printed patterns on a printed wiring board having X, Y, Z coordinates and corresponding reference data, said automatic focusing system comprising:

a TV camera having a line of sight and for observing the printed patterns;

reference point means for designating a plurality of reference points on the printed wiring board;

measuring means for measuring distances from the TV camera to the reference points;

calculating means for calculating one of a plurality of surface plane equations corresponding to a plurality of triangular planes each formed by groups of three of the reference points adjacent to each other, the formed triangular planes not crossing each other, said calculating means operating while having the printed wiring board in the X, Y and Z coordinates and calculating Z coordinates of the reference points from the distances measured by said measuring means;

inspecting point means for designating an inspecting point having a surrounding area from the plurality of reference points, the inspecting point being defined by corresponding X and Y coordinates for aligning the line of sight of said TV camera with the inspecting point to observe the surrounding area of the object around the designated inspecting point;

selecting means for selecting a triangular plane corresponding to one of the surface plane equations, which includes the X and Y coordinates of the designated inspecting point, from the plurality of the triangular planes;

Z-calculation means for calculating a Z coordinate of the designated inspecting point by substituting the corresponding X and Y coordinates of the designated inspecting point into the surface plane equation corresponding to the selected triangular plane;

focusing means for focusing said TV camera in accordance with the calculated Z coordinate of the designated inspecting point;

positioning means for moving the printed wiring board in X and Y directions so that the designated inspecting point is on the line of sight of said TV camera, from a previous position of the printed wiring board, in which a previous inspecting point has been on the line of sight of said TV camera;

area inspecting means for inspecting the surrounding area, existing around the designated inspecting point, of the printed patterns and for comparing the inspected area with the reference data of the printed pattern;

executing means for executing said inspecting point means, said selecting means, said Z-calculation means, and said focusing means while executing said positioning means;

repeating means for repeating execution of said executing means and said area inspecting means, to inspect the surrounding area existing around a next inspecting point, of the printed patterns until all surrounding areas existing around all inspecting points previously designated are inspected; and automatic execution means for executing said reference point means, said measuring means, said calculating means, said inspecting point means, said selecting means, said Z-calculation means, said focusing means, said positioning means, said area inspecting means, said executing means and said repeating means automatically.

4. An automatic focusing system according to claim 3, wherein said automatic execution means comprises:
a micro processing unit;
a read only memory connected to said microprocessing unit storing programs for executing operation of said micro processing unit;
a random access memory connected to said microprocessing unit storing data; and
a memory connected to said microprocessing unit storing the reference data of the printed patterns.

5. An automatic focusing system according to claim 4, wherein said memory comprises a floppy disk.

6. An automatic focusing system according to claim 3, wherein said measuring means comprises:
a slit mark projector for optically projecting a slit mark onto a surface of the printed wiring board, the slit mark causing said TV camera to output a video signal corresponding to the slit mark, thereby changing a position of the video signal in the X coordinate in accordance with a change of the distance between said TV camera and the surface of the printed wiring board; and
means for processing distance information between said TV camera and the surface of the printed wiring board, based on an amount of change of the video signal position.

7. A method of automatic focusing for a TV camera used to inspect an object set in X, Y and Z coordinates, the TV camera having a line of sight directed in parallel to the Z-coordinate axis, said method comprising the steps of:

designating at least three reference points upon a surface of the object for inspecting the object, the reference points having corresponding X and Y coordinates;

measuring distances from the TV camera to the designated reference points;

designating an inspecting point within an area defined by three of the reference points adjacent each other;

calculating a distance from the TV camera to the designated inspecting point in accordance with a surface plane equation corresponding to the three adjacent reference points and the measured distances from the TV camera to the designated reference points; and focusing the TV camera in accordance with the calculated distance while simultaneouly aligning the TV camera line of sight with the designated inspecting point.

8. The method according to claim 7, wherein said measuring step includes projecting an optical slit mark obliquely onto the surface of the object, outputting video signals from the TV camera corresponding to the optical slit mark and processing the output video signals for focusing the TV camera.

9. The method according to claim 7, wherein said calculating step includes the steps of:
selecting a triangular plane formed by a group of three of the designated reference points which include the designated inspecting point; and
substituting X and Y coordinates of the designated inspecting pont into the surface plane equation corresponding to the selected triangular plane.

10. The method according to claim 7, wherein said focusing step comprises moving the object relative to the TV camera in a direction parallel to the Z-coordinate axis.

11. A method of automatic focusing for a TV camera used to inspect an object, said method comprising the steps of:
measuring distances from the TV camera to previously designated reference points on a surface of the object;
calculating a distance from the TV camera to a designated inspecting point in accordance with a surface plane equation and the measured distances, said calculating step including selecting a triangular plane formed by a group of three of the designated reference points which include the designated inspecting point and substituting X and Y coordinates of the designated inspecting point into the surface plane equation corresponding to the selected triangular plane; and
focusing the TV camera in accordance with the calculated distance while simultaneously aligning the designated inspecting point with the TV camera.

* * * * *

UNITED STATES PATENT AND TRADEMARK OFFICE
CERTIFICATE OF CORRECTION

PATENT NO.  : 4,851,903

DATED       : July 25, 1989

INVENTOR(S) : Ikeda et al.,

It is certified that error appears in the above-identified patent and that said Letters Patent is hereby corrected as shown below:

Col. 1, line 11, "insepcting" should be --inspecting;

line 35, delete "of" (first occurrence).

Col. 2, line 35, delete ";".

Col. 3, line 28, after "art" insert --,--;

line 49, 51 and 62, "focussing" should be --focusing--.

Col. 4, line 1, delete "a";

Col. 4, line 2 "focussing" should be --focusing--;

Col. 4, line 10, "focussing" should be --focusing--;

line 11, after "invention" insert --;--;

line 26, "corners" should be --corner--;

line 39, "coordinates" should be --coordinate--;

line 47, "focussing" should be --focusing--;

line 64, delete "the" (second occurrence).

UNITED STATES PATENT AND TRADEMARK OFFICE
CERTIFICATE OF CORRECTION

PATENT NO. : 4,851,903

DATED : July 25, 1989

INVENTOR(S) : Ikeda et al.

It is certified that error appears in the above-identified patent and that said Letters Patent is hereby corrected as shown below:

Col. 5, line 24, change "a" to --A--;

line 26, change "a slant" to --aslant--.

Col. 6, line 7, "focussing" should be --focusing--.

Col. 7, line 16, "singal" should be --signal--;

line 33, "Doing enables" should be --Doing so enables --.

Col. 8, line 14, "P9" should be --P4--;

line 20, at "although" insert a paragraph indention;

line 33, "OHD2" should be --$O_z$ --.

Col. 9, lines 9 and 13, "focussing" should be --focusing--.

Col. 10, line 7, "area" should be --areas--.

Col. 12, line 17, "simultaneouly" should be --simultaneously--.

UNITED STATES PATENT AND TRADEMARK OFFICE
CERTIFICATE OF CORRECTION

PATENT NO. : 4,851,903
DATED : July 25, 1989
INVENTOR(S) : Ikeda et al.

It is certified that error appears in the above-identified patent and that said Letters Patent is hereby corrected as shown below:

After Claim 10, insert

--11. The method according to claim 7, wherein said focusing step comprises moving the TV camera relative to the object.--.

Claim "11." should be --12--.

Signed and Sealed this

Eleventh Day of September, 1990

Attest:

HARRY F. MANBECK, JR.

Attesting Officer     Commissioner of Patents and Trademarks